United States Patent
Wagner et al.

[11] Patent Number: 5,320,024
[45] Date of Patent: Jun. 14, 1994

[54] VACUUM BRAKE FORCE BOOSTER FOR AUTOMOTIVE VEHICLES

[75] Inventors: Wilfried Wagner, Huettenberg-Weidenhausen; Kai-Maichael Graichen, Langen, both of Fed. Rep. of Germany

[73] Assignee: Alfred Teves GmbH, Frankfurt am Main, Fed. Rep. of Germany

[21] Appl. No.: 634,169

[22] PCT Filed: Jan. 30, 1990

[86] PCT No.: PCT/EP90/00163

§ 371 Date: Dec. 17, 1990

§ 102(e) Date: Dec. 17, 1990

[87] PCT Pub. No.: WO90/12715

PCT Pub. Date: Nov. 1, 1990

[30] Foreign Application Priority Data

Apr. 22, 1989 [DE] Fed. Rep. of Germany ....... 3913263

[51] Int. Cl.$^5$ .................................. F15B 9/10
[52] U.S. Cl. .................................. 91/376 R; 92/99
[58] Field of Search .................. 92/98 R, 99, 100; 91/369.1, 369.2, 376 R

[56] References Cited

U.S. PATENT DOCUMENTS

| | | | |
|---|---|---|---|
| 2,989,035 | 6/1961 | Stelzer | 92/99 X |
| 4,043,251 | 8/1977 | Ohmi | 91/376 R |
| 4,453,450 | 6/1984 | Horsting | 91/376 R |
| 4,587,889 | 5/1986 | Ohki et al. | 92/99 X |
| 4,671,167 | 6/1987 | Endo et al. | 91/369.2 |
| 4,765,226 | 8/1988 | Bequet et al. | 91/369.2 |
| 4,800,799 | 1/1989 | Nishii | 91/376 R |
| 4,803,912 | 2/1989 | Nishii | 92/99 X |
| 5,007,329 | 4/1991 | Toepperwien | 92/99 X |

FOREIGN PATENT DOCUMENTS

| | | | |
|---|---|---|---|
| 2121898 | 1/1984 | United Kingdom | 91/369.1 |
| 2181805 | 4/1987 | United Kingdom | |

*Primary Examiner*—Edward K. Look
*Assistant Examiner*—Hoang Nguyen
*Attorney, Agent, or Firm*—Robert P. Seitter; J. Gordon Lewis

[57] ABSTRACT

To preclude a rolling diaphragm forming together with a metallic diaphragm plate the movable wall of a vacuum brake force booster from being detached from a groove accommodating the radially inward area of the rolling diaphragm, it is provided, in the practice of the invention, that the contour of a supporting face for the diaphragm plate formed on the control valve housing and the contour of the radially inward area (sealing bead of the rolling diaphragm correspond to the curved shaped of the radially inward area (curvature) of the diaphragm plate, and that both the contour of the supporting face and the one of the radially inward area (sealing bead) of the rolling diaphragm correspond to the curved shape of the radially inward area (curvature) of the diaphragm plate, and that the groove with the axial dimension thereof extends into the bearing area of the diaphragm plate of the support face.

13 Claims, 2 Drawing Sheets

VACUUM BRAKE FORCE BOOSTER FOR AUTOMOTIVE VEHICLES

The present invention relates to a vacuum brake force booster for use with automotive vehicles, comprising a vacuum housing which, through an axially movable partition to which pneumatic differential pressure may be applied, is sealingly subdivided into a vacuum chamber and a working chamber, with the movable partition being formed by a metal diaphragm plate and a rolling diaphragm adjacent thereto, and comprising a mechanically operable control valve for establishing a communication between the working chamber and the vacuum chamber or the atmosphere, respectively, the axially movable control housing of which is formed of a thermoplastic material and comprises a supporting face for the radially inward area of the diaphragm plate exhibiting an annular curvature, as well as a radial groove to accommodate the radially inward area of the rolling diaphragm.

BACKGROUND OF THE INVENTION

A brake force booster of the afore-described type and the way of fixing the movable wall thereof to the control valve housing is known to those skilled in the art. The diaphragm plate of such brake booster, in the radially inward area thereof, comprises a circumferential curvature seated on a rectangular support surface formed on a control valve housing such that in case of a pressure load on the movable partition wall, a rolling movement of the diaphragm plate may take place. The support surface of the diaphragm plate is followed by a groove of rectangular cross-section accommodating a bead correspondingly shaped in the radial-inward area of the rolling diaphragm.

However, in prior known brake force boosters of this type, in predetermined operating conditions, the rolling diaphragm is likely to be detached, thereby substantially affecting the operating safety of the system. This danger occurs especially as a result of stagnation pressure in the brake system through actuation thereof without vacuum and with closed check valve outlets, respectively, since the view of the pressure prevailing in the brake force booster housing force components are formed which act in the radial direction, tending to withdraw the annular bead of the rolling diaphragm from the circumferential groove of the control valve housing and to displace the diaphragm plate in a direction opposite the actuating force, thereby forcing the annular bead out of the groove. This will result in the failure of the brake system the boosting force of which no longer can be built up.

Equally disadvantageous are the material tensions or stresses in the control valve housing particularly high in view of the rectangular configuration of the support face of the diaphragm plate and of the groove accommodating the rolling diaphragm, which tensions, in predetermined circumstances, are likely to destroy the control valve housing.

BRIEF DESCRIPTION OF THE INVENTION

It is, therefore, the object of the present invention to avoid the afore-described disadvantages and to so configure a vacuum brake force booster exhibiting the generic features as to ensure the operating safety thereof, maintaining the type of design and systems characteristics and using the components available.

The problem underlying the invention is solved in that both the contour of the supporting surface and that of the radially inward area (sealing bead (42)) of the rolling diaphragm (18) conforms to the curved shape of the radial-inward area (curvature (34)) of the diaphragm plate (19), and that the groove with the axial dimension thereof extends into the bearing area of the diaphragm plate on the supporting surface.

The afore-described measures will ensure an improved off-rolling of the diaphragm plate on the control valve housing when transmitting the boosting force, a substantial reduction of the material tensions or stresses in the clamping area of the movable partition wall, and a substantially simplified assembly.

The groove, preferably in the area disposed below the supporting face of the diaphragm plate, exhibits a curvature which, in cross-section, is of a circular-segment shape and cooperates with a curvature formed in the radially inward area of the rolling diaphragm.

An enhanced operating safety with a view to the tensions occurring in the clamping area of the movable partition wall, in an advantageous form of embodiment of the principle of the invention, is attained in that the radially inward area of the rolling diaphragm is formed by an axially projecting annular collar of substantially the same material thickness as the part of the rolling diaphragm adjacent the diaphragm plate, which collar, on the side facing away from the diaphragm plate, exhibits a radial shoulder, with a holding element being provided, applying a radially acting force to the collar.

The holding element is formed by a slitted ring, a worm-shaped spring or a rubber ring preferably cast on the rolling diaphragm, according to another form of embodiment of the invention, is provided between the shoulder and the portion of the rolling diaphragm adjacent the internal area of the diaphragm plate, thereby ensuring that, through the preload of the holding element, the rolling diaphragm in addition to its inherent preload, is forced into the groove. The key-shaped form-lock provided by this in-force process precludes an axial movement of the diaphragm plate vis-a-vis the control valve housing.

Additional details and advantages of the vacuum brake force booster according to the invention will become manifest from the following description of five examples of embodiment of the invention explained with reference to the enclosed drawings, with corresponding parts being provided with the same reference numerals.

DETAILED DESCRIPTION OF THE PREFERRED AND ALTERNATIVE EMBODIMENTS OF THE INVENTION

Figure 1:
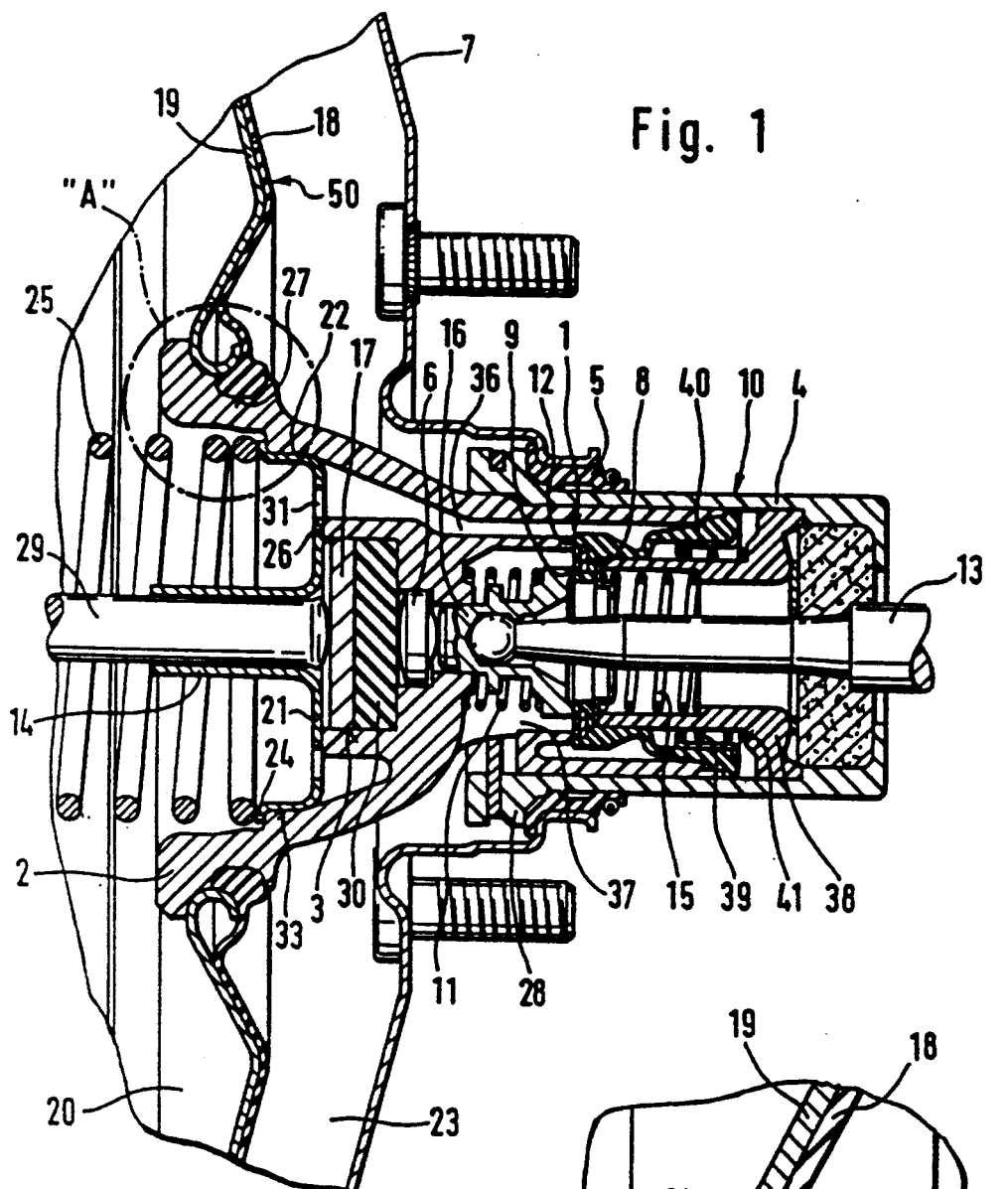
FIG. 1 shows a partial longitudinal section of a first form of embodiment of the vacuum brake force booster according to the invention.

The housing of the vacuum brake force booster as shown in FIG. 1 is composed of two housing portions interconnected by indentation means at some point of connection, of which for ease of understanding, only the brake pedal-sided housing portion 7 is partially shown. The interior of the housing, through a movable wall 50, is subdivided into a vacuum chamber 20 which, through a pneumatic connection, is in communication with a vacuum source (not shown in any detail), and a working chamber 23.

The movable wall 50 formed by a metallic diaphragm plate 19 and a rolling diaphragm 18 adjacent thereto, within the working chamber 23 according to the embodiment are both formed with a central opening receiving and fixed to a control valve housing 10 of bipartite configuration. As especially revealed by FIG. 2, the diaphragm plate 19, in its radially inward, is formed with a lip extending about the central opening, the lips having an annular curvature 34 bent toward the rolling diaphragm 18 forming a partially toroidal surface. A radially stepped annular groove is recessed into the front portion 2 of the control valve housing 10. A first outer step of the groove defines a supporting face 35, with the contour being partially circular in cross sectional shape matched corresponding to the said curvature 34 of the partially toroidal shape of the diaphragm inner lip, and, upon actuation of the vacuum pressure brake force booster, permitting a rolling movement of the diaphragm plate 19. The supporting face 35 is followed by a second groove step 27 formed in the front housing portion 2 and accommodating the radially inward area of the rolling diaphragm 18 formed as an annular circumferential sealing bead 42. The control valve housing 10, includes cylindrical guiding portion 4, projecting from the booster housing 7 and, through a boot (not shown) is protected against contamination of the surface thereof. The control valve housing 10, also includes a sliding guide ring 5, which seals the working chamber 23 against the atmosphere.

Figure 2:
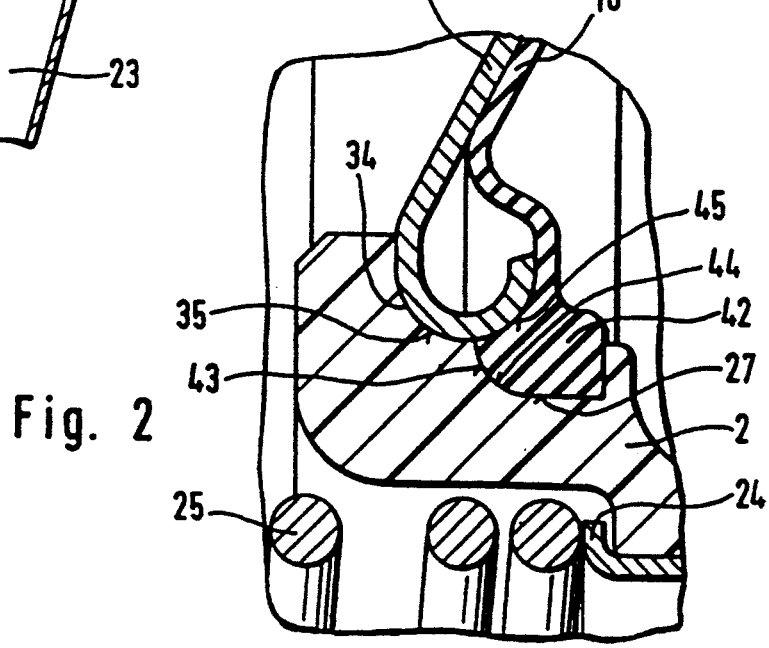
FIG. 2 shows detail "A" as illustrated in FIG. 1, in enlarged scale.
Figure 3:
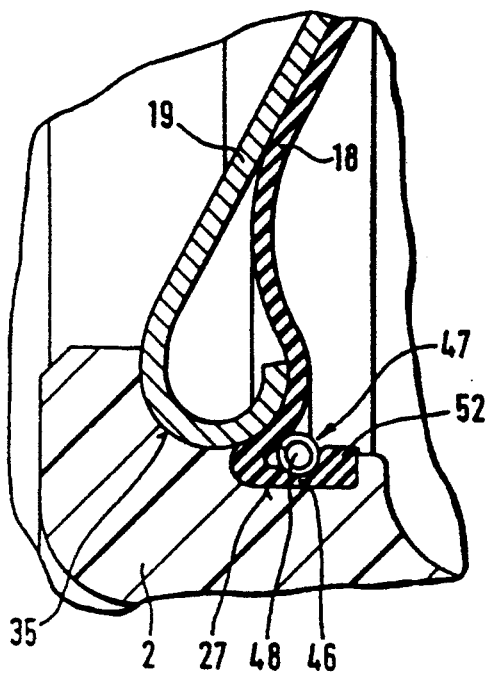
FIG. 3 shows a second form of embodiment of the clamping of the movable partition wall of the vacuum brake force booster according to the invention.
Figure 4:
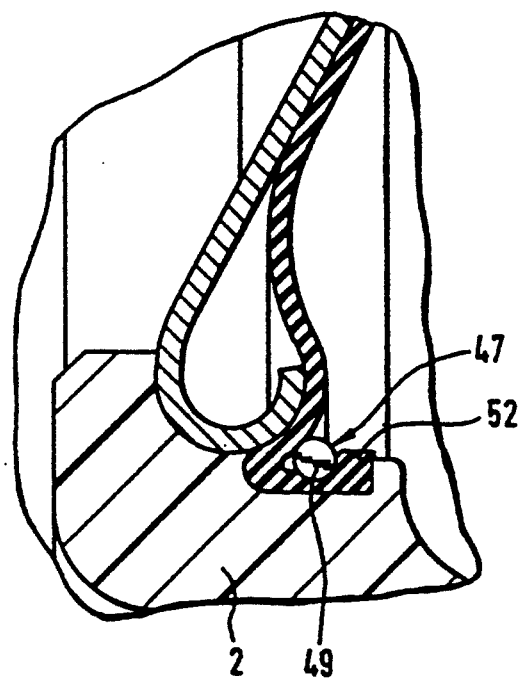
FIG. 4 shows a third form of embodiment of the clamping of the movable partition of the vacuum brake force booster according to the invention.
Figure 5:
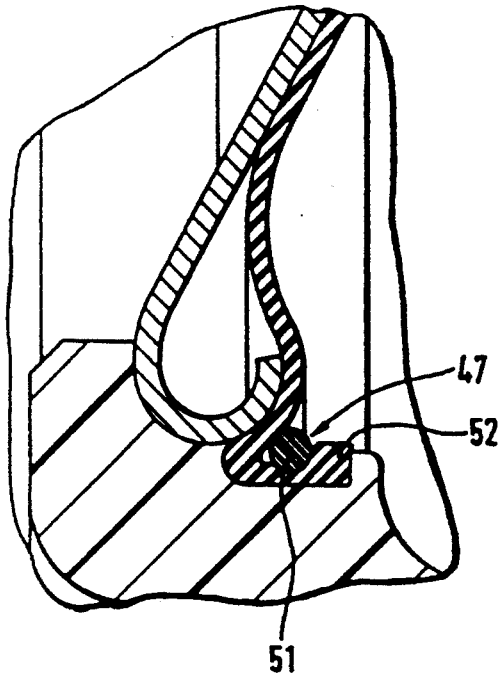
FIG. 5 shows a fourth form of embodiment of the clamping of the movable wall of the vacuum brake force booster of the invention.

The second 27 step of the groove, as shown in FIG. 2, is on left hand side thereof adjacent the first step is formed with a curvature 43 which, in cross-section, is of a circular segment-type configuration and extends into the bearing area of the diaphragm plate 19 on the support surface 35, with the sealing bead 42 exhibiting a curvature 44 conforming in shape to the curvature 43. This curvature is followed by another curved section 45 matching the curvature 34 formed on the diaphragm plate 19. The lip of the diaphragm plate 19 projects over the groove second inner step to compress the sealing bead against the sharp corner at the outside of the inner step.

A control rod composed of piston rod 13 and valve piston 16 is disposed, in axially displaceable manner, in the interior of the control valve housing 10, and, through a yoke (not shown in any detail), can be connected to a brake pedal of an automotive vehicle. The control valve housing 10, moreover, contains a valve assembly 1, 9, 12 actuated by the valve piston 16 and controlling, through channels 36, 37, the pressure difference between vacuum chamber 20 and working chamber 23. The front portion 2 of the control valve housing 10 is disposed in the vacuum chamber 20 and defines a bore 3 in which is located a reaction disc 30 and a pressure plate 17. A push rod 29 in abutment with the pressure plate 17 actuates a master brake cylinder (not shown in any detail) which is secured to the front side of the booster housing.

For restoring the booster plate 19, a restoring spring 25 is provided, which is clamped between the front portion 2 of the control valve housing 10 and the bottom of the booster housing.

The control unit of the vacuum brake force booster is shown in the release position, i.e. in a position in which the two chambers 20, 23 are separated from one another. For, in that position, the two sealing seats 9, 12 are in abutment with the sealing face of poppet valve 1 which, on the side facing away from the sealing face, exhibits a stop 8 which, through a sleeve 38, strikes there against in guide portion 4. The guide portion 4, in the releasing position, with a collar 28 thereof, is in abutment with the slide guiding ring 5, with the sealing seat 9 on the control valve piston 16, through a piston rod restoring spring 11 being forced against the sealing face of the poppet valve 1. The poppet valve 1, at the same time, through a compression spring 15, is preloaded toward the two sealing seats 9, 12, with the compression spring 15, with the other end thereof, being supported on the sleeve 38. Moreover, a second compression spring 39 is provided which, on the one hand, is supported on a guide 40 of the poppet valve 1 and, on the other hand, is supported on an annular surface 41 of the sleeve 38 to keep apart the two control valve housing sections 2, 4.

To ensure a precise guidance of the push rod 29, a guiding sleeve 14 is provided the radial flange 21 of which is supported on an annular face 26 on the control valve front portion 2 to pass over into a cylindrical guide face 22, cooperating with a cylindrical section 33 formed on the front portion 2 to thereby effectively receive the bending forces acting upon the push rod 29. The radial flange 21 provided, in the area of termination of the vacuum channel 36, is provided with a plurality of openings 31, is locked against dropping by the restoring spring 25 supported on a radial collar 24 following the cylindrical guiding surface 22. As the push rod 29 is formed separately from the pressure plate 17 the guiding sleeve 14 may be, as shown, of a cylindrical configuration.

The reaction disc 30 is located in a section of the stepped bore 3 facing the vacuum chamber 20, with a transmission disc 6 being located in the second section of smaller diameter of the said stepped bore and cooperating with the control valve piston 16, and with the face thereof in contact with the reaction disc 30 determining the transmission ratio of the brake system.

In the embodiment of the clamping area of the movable wall 50 as shown in FIGS. 3, 4, 5 and 6, the radially inward area of the rolling diaphragm 18 is in the form of an axially projecting annular collar 46 the material thickness of which corresponds to the one of the portion of the rolling diaphragm 18 in abutment with the diaphragm plate 19. The curvature 44 formed within the radially inward area of the rolling diaphragm 18 is formed by the transitory portion between the collar 46 and the section 45 in abutment with the diaphragm plate 19 and the curvature 34 thereof, respectively, with a holding element 47 being provided in the key-shaped interval between the collar 46 and the section 45, which applies a force component acting on the collar 46 supporting the retaining force resulting from the preload of the rolling diaphragm 18 clamped into the groove 27.

The holding element 47 formed as a worm-shaped spring 48 (FIG. 3), a slitted or split ring 49 made of metal or plastic material (FIG. 4) and a flexible rubber ring 51, respectively is locked in position by a radial shoulder 52 formed on collar 46. It is not imperative for the rings 49 and 51 to have a circular cross-sectional face so that both a polygonal and an oval cross-sectional configuration will be permitted.

Figure 6:
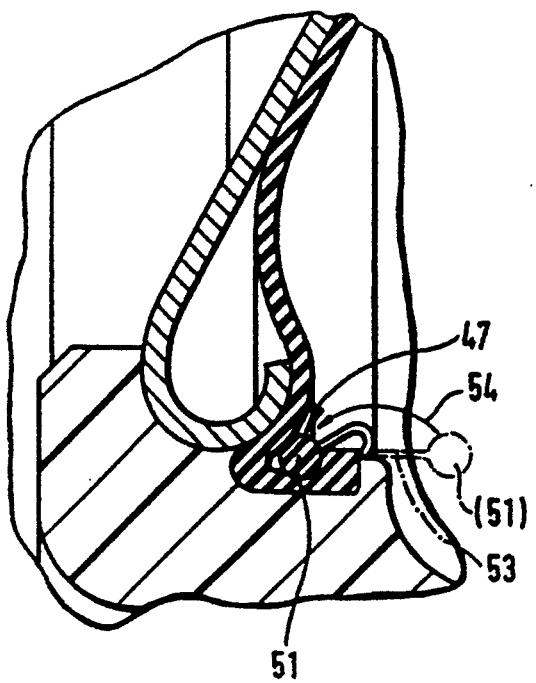
FIG. 6 is a preferred form of embodiment of the clamping variant as shown in FIG. 5.

In the form of embodiment of the principle of the invention as shown in FIG. 6, the rubber ring 51 is cast to the rolling diaphragm 18 such that, through a cylindrical area 53 of some minor thickness, it is in communication with the collar 46. As shown by arrow 54 in FIG. 6, the cylindrical area 53 is bent during assembly to force the rubber ring 51 into the previously mentioned key-shaped interval. The cylindrical area 53 also can be configured by a plurality of webs uniformly distributed along the circumference.

What is claimed is:

1. A vacuum brake force booster for automotive vehicles, comprising a vacuum housing, an axially movable wall in said housing to which a pneumatic differential pressure may be applied, said movable wall subdividing said housing into a vacuum chamber and a working chamber, said movable wall formed by a metallic diaphragm plate and a rolling diaphgram in abutment therewith, a mechanically actuable control valve for establishing communication between said working chamber and said vacuum chamber or the atmosphere, respectively, said control valve including an axially movable control valve housing having a front portion, said diaphgram plate and said rolling diaphragm each having a central opening receiving said front portion of said control valve housing, a radially stepped annular groove recessed in said front portion of said control valve housing, a first outer step of said groove curved in an axial direction so that the cross sectional shape thereof substantially forms a segment of a circle, said opening of said diaphragm plate having a radially innermost lip extending around said central opening, and formed as a partially toroidal shape matched to be interfit into said curved outer step of said groove, a second inner step of said groove; an innermost sealing bead portion of said rolling diaphragm received in said second inner step of said groove, said partially toroidal lip of said diaphragm plate having a projecting portion projecting over said second inner step of said groove and facing radially inward inclined towards the bottom of said second step, directly engaging said sealing bead to compress said sealing bead of said rolling diaphragm within said second step of said groove.

2. A vacuum brake force booster according to claim 1, wherein said second inner step of said groove has a radially extending wall adjacent said first outer step formed with a circular curvature, said sealing bead of said rolling diaphragm formed with a matching curvature formed in the radially inward area of the rolling diaphragm and fit thereagainst.

3. A vacuum brake force booster for automotive vehicles, comprising a vacuum housing, an axially movable wall in said housing to which a pneumatic differential pressure may be applied, said movable wall subdividing said housing into a vacuum chamber and a working chamber, said movable wall formed by a metallic diaphragm plate and a rolling diaphragm in abutment therewith, a mechanically actuable control valve for establishing communication between said working chamber and said vacuum chamber or the atmosphere, respectively, said control valve including an axially movable control valve housing having a front portion, said diaphragm plate and said rolling diaphragm each having a central opening receiving said front portion of said control valve housing, a radially stepped annular groove recessed in said front portion of said control valve housing, a first outer step of said groove curved in an axial direction so that the cross sectional shape thereof substantially forms a segment of a circle, said opening of said diaphragm plate having a radially innermost lip extending around said central opening, and formed as a partially toroidal shape matched to be interfit into said curved outer step of said groove, a second inner step of said groove; an innermost sealing bead portion of said rolling diaphragm received in said second inner step of said groove, said partially toroidal lip of said diaphragm plate having a projecting portion projecting over said second inner step of said groove and facing radially inward inclined towards the bottom of said second step, said rolling diaphragm of uniform material thickness and having an annular collar comprised of an inner portion turned from an adjacent radially extending section of said rolling diaphragm whereby said annular collar extends axially away from said diaphragm plate and across said inner step of said groove to form a shoulder lying against an inner wall defining said inner step adjacent said outer step, said annular collar terminating in said rolling diaphragm sealing bead lying against an outer wall also defining said inner step, a holding element disposed over said annular collar and against said sealing bead, which holding element applies a radially inward acting force on said annular collar; said projecting portion of said toroidal lip acting through said adjacent radially extending section of said rolling diaphragm to compress said holding element against said sealing bead and clamp said sealing bead within said second step of said groove.

4. A vacuum brake force booster according to claim 3, wherein said holding element comprises a slitted ring.

5. A vacuum brake force booster according to claim 4, wherein said slitted ring is made of metal.

6. A vacuum brake force according to claim 4, wherein said slitted ring is made of plastic material.

7. A vacuum brake force booster according to claim 3, wherein said holding element comprises a rubber ring.

8. A vacuum brake force booster according to claim 7, wherein said rubber ring is integrally cast on said rolling diaphragm.

9. A vacuum brake force booster according to claim 3, wherein said holding element is formed by a worm-type spring.

10. A vacuum brake force booster according to claim 7, wherein said rubber ring is of a circular cross-section.

11. The vacuum brake force booster according to claim 1 wherein said diaphragm plate is formed of sheet material of uniform thickness, said lip comprising a loop formed into said partially toroidal shape.

12. The vacuum brake force booster according to claim 1 wherein said rolling diaphragm bead seal is formed with a curved surface adjacent to said curved outer step of said groove, matched together to form a substantially continuous curve complementary to said toroidal lip of said diaphragm plate, said curved surface engaged by said toroidal lip to be compressed thereby.

13. The vacuum brake force booster according to claim 1, wherein said groove inner step is bounded on the side away from said outer step with a sharp corner against which said bead seal is abutted to be compressed thereagainst by said lip.

* * * * *